United States Patent Office 3,432,450
Patented Mar. 11, 1969

3,432,450
USE OF BROMINATED SALICYLANILIDE AS A FIRE RETARDANT FOR POLYMERIC MATERIALS
Zvi Enrico Jolles, Harlow, England, assignor to Berk Limited
No Drawing. Filed Apr. 25, 1967, Ser. No. 633,403
Claims priority, application Great Britain, Apr. 29, 1966, 18,987/66
U.S. Cl. 260—2.5
Int. Cl. C08f 47/08; C09k 3/28; C08g 22/44
9 Claims

ABSTRACT OF THE DISCLOSURE

Natural and synthetic organic polymeric materials are rendered non-flammable by the incorporation of a small proportion of a brominated salicylanilide as fire retardant. Preferred brominated salicylanilides contain 2 to 7 bromine atoms per molecule and, optionally, one or more chlorine atoms. A second fire retardant derived from antimony, arsenic or bismuth, preferably antimony oxide, is also preferably used.

---

The present invention is concerned with improvements in or relating to organic polymeric compositions.

We have found that the fire retardancy of organic polymeric compositions is improved by the incorporation therein, as a fire retardant, of a brominated salicylanilide which optionally contains one or more chlorine atoms, in such an amount as to provide a bromine content of at least 0.5% based on the weight of the polymeric composition.

According to the present invention therefore, we provide an organic polymeric composition comprising as a fire retardant, a brominated salicylanilide in an amount such as to provide a bromine content of at least 0.5% based on the weight of the polymeric composition.

The brominated salicylanilides can be used to increase the fire retardancy of natural organic polymers, such as rubber, as well as synthetic organic polymers, including thermoplastics and thermosetting resins. Among the thermosetting resins which can be treated with advantage are, for example, phenol formaldehyde resins, urea formaldehyde resins, melamine formaldehyde resins, epoxide resins and alkyd resins, and among the thermoplastics are, for example, polyolefins, linear polyurethanes, vinyl polymers and copolymers, polystyrene, linear polyesters, and polyamides.

Although monobromosalicylanilides will impart fire retardancy to organic polymeric compositions, it is preferred to use polybromosalicylanilides, since smaller proportions of the latter are required to produce the same fire retardancy as that obtained with a given amount of the monobromosalicylanilides. It is preferred to use salicylanilides containing 2 to 6 bromine atoms per molecule or heptabromosalicylanilide. Examples of preferred salicylanilides for use in accordance with the invention are all the isomers of tribromosalicylanilide and dibromosalicylanilide, 2',4' - dibromo - 5 - chloro - salicylanilide, 4'-bromo-5-chloro-salicylanilide and penta- and hexabromosalicylanilides.

The bromine content which it is preferred to obtain in the polymeric composition by the incorporation of the brominated salicylanilide will depend upon the inherent fire retardancy of the polymeric composition (thus chlorinated rubbers, polyurethanes formed from brominated diisocyanates and/or phosphated polyols, and foamed polystyrene, for example, have some inherent fire retardancy) and the degree of fire retardancy desired, i.e. whether it is desired to obtain a non-burning or self-extinguishing material.

For foamed polystyrene, the bromine content after addition of the fire retardant compound is preferably from 0.5 to 1%. In polyurethanes, the bromine content is preferably from 10 to 15% by weight of the polymer, whereas in polyesters, a bromine content of from 0.5 to 10% by weight of the composition is preferred. It is generally uneconomic to have a bromine content of more than 20% by weight of the polymeric composition.

In many instances the effectiveness of the brominated salicylanilide as a fire retardant can be increased by incorporating in the organic polymeric composition, one or more further ingredients such as the oxides or sulphides of antimony, bismuth or arsenic or organic antimonates. We have found that antimony oxide, in particular, when added to certain organic polymeric compositions, especially polyesters and polyolefins, in conjunction with the brominated salicylanilide, will impart a greater degree of fire retardancy than that obtainable by the addition of the same amount of brominated salicylanilide alone. It has been found that a ratio by weight of antimony oxide to fire retardant of at least 1:10 is necessary to increase measureably the fire retardancy of the organic polymeric composition as compared with the use of the fire retardant compound alone. It is preferred to add antimony oxide in the range of 0.5 to 1.5:1 by weight of fire retardant. Greater increase in fire retardancy can be achieved with a ratio of antimony oxide to fire retardant of 2 or more :1.

Normal reaction and processing conditions can be employed for the preparation of the organic polymeric composition and the fire retardant can be incorporated at any suitable stage in the manufacture of the organic polymeric composition. The time and manner of incorporation of fire retardant will vary with the type of organic polymeric composition into which it is being incorporated.

Other conventional constituents of organic polymeric compositions, such as fillers, pigments, plasticisers and stabilisers may also be present.

Organic polymeric compositions containing a brominated salicylanilide as fire retardant may be used in any suitable manner; for instance they may be moulded or extruded or incorporated into surface coating compositions.

In order that the invention may be more fully understood the following examples (in which all parts and percentages are by weight) are given by way of illustration only:

Example 1

100 parts of Alkathene XDG 33 (registered trademark; a low density polyethylene sold by I.C.I. Ltd.) were fluxed on a two roll mill at 150° C. 13.9 parts of tribromosalicylanilide and 5.8 parts of antimony oxide were added slowly and mixing was continued for 5 minutes after the last addition. The hot mix was moulded in a mould preheated at 160° C. for two minutes, pressed for 2 minutes at 160° C. and then cooled for two minutes under pressure.

The moulded material was cut into 3 strips measuring 5 inches in length by 0.5 inch in width. The strips were marked at 1 inch and 4 inches from one end and were then tested for fire retardancy by A.S.T.M. test procedure D635–56T. The entry in the "Time of burning" column in the following table is the arithmetic mean of the time of burning of the 3 strips tested and was measured from the time the flame reached the mark 1 inch from the ignited end until the flame reached the mark 4 inches away from the ignited end. The flammability classification used is that give in A.S.T.M. D635–56T.

Two comparative tests were carried out using strips prepared as above but (a) with the tribromosalicylanilide and the antimony oxide omitted (Comparative Test 1) and (b) with the tribromosalicylanilide omitted (Comparative Test 2). The results obtained are given in the Table 1 below.

Although, using the ASTM classification, the material of Example 1 is classified as "burning," it will be seen that the rate of burning is more than halved in comparison with that of Comparative Test 1.

TABLE 1

|  | Percent TBSA [1] | Percent Br w./w. percent of resin | Sb$_2$O$_3$ | Time of burning, secs. | Rate of burning, ins./min. | Flammability Classification |
|---|---|---|---|---|---|---|
| Comparative test 1. |  |  |  | 200 | 0.90 | Burning. |
| Comparative test 2. |  |  | 5.8 | 246 | 0.73 | Do. |
| Example 1 | 13.9 | 7.35 | 5.8 | 460 | 0.39 | Do. |

[1] TBSA=Tribromosalicylanilide in all the examples.

Example 2

100 parts of Cellobond A 250 (Registered trademark; an unsaturated poyester resin sold by British Resin Products Limited), 1.6 parts of benzoyl peroxide, 24.6 parts of tribromosalicylanilide, 16 parts of antimony oxide and 67 parts of calcium carbonate filler were mixed together in the above order in a high speed stirrer. The mixture was then hot moulded with glass fibre in the ratio of 90 g. of resin mix to 34 g. of glass fibre. The mould was held under pressure for 2 minutes at 120° C. The moulding was removed hot and conditioned for 1 day at 23° C.

The fire retardancy test adopted, a modified version of B.S. 3532, was as follows:

A cut specimen of the polyester material measuring 5″ long x ½″ wide x ⅛″ thick was marked at 3 inches from the end to be ignited. The specimen was clamped in a rigid support so that its longitudinal axis was horizontal and its transverse axis was at 45° to the horizontal.

A piece of clean wire gauze (18 mesh per linear inch) 5 inches square was clamped horizontally ¼ inch below the specimen with ¼ inch of the unsupported end of the specimen projecting beyond the edge of the gauze. A bunsen burner was placed centrally under the free end of the specimen so that the burner was 2 inches below the longitudinal axis of the specimen, the temperature of the flame was tested and found to be that specified. The flame was removed after 30 seconds and the time taken until the specimen ceased to flame or glow was recorded.

Those specimens which ceased to flame or glow within 10 seconds of removal of the flame were classified as "very low flammability," those specimens which ceased to flame or glow before the flame reached the 3 inch mark were classified a "low flammability," and those specimens which did not extinguish or burned to the 3 inch mark were classified as "flammable."

A comparative test (Comparative Test 3) using the formulation of Example 2 but omitting the tribromosalicylanilide was carried out. The results obtained for Comparative Test 3 and Example 2 are given in Table 2 below.

Example 3

100 parts of Voranol ET 849 (registered trademark; a phosphated polyether sold by Dow Chemicals Ltd.), 22 parts of Propamine A (registered trademark; an amine catalyst sold by Lankro Chemicals Ltd.), 22 parts Silicone DC 113 (registered trademark; a silicone surfactant sold by Midland Silicones Ltd.), and 5.5 parts of Dadco 33 (registered trademark; an amine catalyst sold by Jacobsen Van Den Berg & Co. (U.K.) Ltd.), were mixed together to form a catalyst master batch.

14.2 parts of tribromosalicylanilide were stirred into a further 100 parts of Voranol ET 849 and then 14.95 parts of the catalyst master batch and 27.5 parts of Arcton 11 (registered trademark; a blowing agent sold by I.C.I. Ltd.), were added and the temperature was adjusted to 21° C. 85.8 parts of Hylene TRC (registered trademark; toluene diisocyanate sold by Du Pont) at 21° C. was then added and the mix was stirred vigorously and poured into a suitable mould. The mix was allowed to foam and the foam was conditioned for 1 day.

The foam was tested for flammability according to A.S.T.M. test procedure 1692–59T.

A comparative test (Comparative Test 4) was carried out using the formulation of Example 3 but with no addition of tribromosalicylanilide. The results obtained for Example 3 and Comparative Test 4 are given in Table 3 below. The flammability classification used is that given in A.S.T.M. 1692–59T.

TABLE 3

|  | Percent TBSA | Percent Br w/w of resin | Extent of burning in inches | Flammability Classification |
|---|---|---|---|---|
| Comparative test 4. |  |  | 1.5 | Self-extinguishing. |
| Example 3 | 14.2 | 7.5 | 0.63 | Non-burning. |

Example 4

100 parts of Cyclolac T1000 Nat. (registered trademark; an acrylonitrile-butadiene styrene copolymer sold by Marbon Chemicals Co. Ltd.) sufficiently fine to pass through 100 mesh B.S. sieve were fluxed in a two roll mill, the temperature of the front roll being 160° C. and that of the back roll being 150° C. 15 parts of tetrabromosalicylanilide and 15 parts of antimony trioxide were added slowly and mixing was continued for 5 minutes after the last addition. The hot mix was moulded in a mould preheated at 160° C. for 2 minutes, pressed at a pressure of 100 lbs. per square inch pressure and a temperature of 160° C. for a further 2 minutes and then cooled for 2 minutes at a pressure of 500 lbs. per square inch.

The moulded material was cut into 5 specimens meas-

TABLE 2

|  | Percent TBSA | Percent Br w./w. of resin | Time of burning (secs.) | Flammability class |
|---|---|---|---|---|
| Comparative test 3. |  |  | 360 to burn to 3″ mark. | Outside B.S. spec. classed as "flammable." |
| Example 2 | 24.6 | 12.8 | 13 | Low flammability. | uring 5 inches in length by 0.5 inch in width by 0.125 inch in depth. The specimens were conditioned for 24 hours at 23° C. before testing for fire retardancy.

The specimens were tested for fire retardancy by A.S.T.M. test procedure D635–56T except that the number of specimens tested was 5 and not 10 as laid down in the test. The flammability classification used is that given in A.S.T.M. D 635–56T. The results obtained are given in Table 4 below.

A comparative test was carried out using strips prepared as above but with tetrabromosalicylanilide and antimony trioxide omitted. Fire retardancy tests on the comparative strips were discontinued after three of them were found to be burning. The rate of burning was 1 inch per minute.

Example 5

The process of Example 4 was repeated using 15 parts of dibromonochlorosalicylanilide in place of the 15 parts of tetrabromosalicylanilide. The specimens were tested for fire retardancy in the same manner as that used in Example 4 and the results obtained are shown in Table 4 below.

Example 6

The process of Example 4 was repeated using 15 parts of tribromosalicylanilide in place of the 15 parts of tetrabromosalicylanilide. The fire retardancy results obtained are given in Table 4 below.

Example 7

The process of Example 4 was repeated using 100 parts of Alkathene XDG 33, 10 parts of tetrabromosalicylanilide and 10 parts of antimony trioxide in place of the 100 parts of Cycolac T 1000 Nat., 15 parts of tetrabromosalicylanilide and 15 parts of antimony oxide respectively. The material in the mould was pressed at a temperature of 150° C. The specimens were tested for fire retardancy in the same manner as that used in Example 4 and the results obtained are shown in Table 4 below. Testing was discontinued after 3 specimens were found to be burning according to the A.S.T.M. classification.

A comparative test was carried out using strips prepared as for Example 7 but with the tetrabromosalicylanilide and antimony oxide omitted. The specimens were tested in the same manner as that used for Examples 4–7. The tests were discontinued when 3 strips were found to be burning. This rate of burning was 0.9 inch per minute.

Example 8

The process of Example 7 was repeated using, instead of tetrabromosalicylanilide, 10 parts of dibromomonochlorosalicylanilide. The results obtained are given in Table 4 below.

Example 9

The process of Example 7 was repeated using 10 parts of heptabromosalicylanilide in place of the 10 parts of tetrabromosalicylanilide. The fire retardancy results obtained are shown in Table 4 below.

Example 10

100 parts of Cellobond A 250 (registered trademark, an unsaturated polyester resin sold by British Resin Products Ltd.,), 10 parts of tetrabromosalicylanilide, 1.6 parts of benzoyl peroxide, 10 parts of antimony oxide and 120 parts of calcium carbonate filler were mixed together, each item being stirred in separately in the above order using a high speed stirrer until the mixture was homogeneous. The mixture was then hot moulded in a mould preheated under light pressure for 2 minutes. The material in the mould was pressed at a temperature of 120° C. and a pressure of at least 200 lbs. per square inch for 1 minute 40 seconds. The material was pressed for a total of 2 minutes. The moulding was removed hot and conditioned for 24 hours at room temperature.

Specimens of the material were cut and tested for flame retardancy by the modified version of B.S. 3532 described in Example 2. The results obtained are shown in Table 5 below and are expressed according to the classification laid down in B.S. 3532.

A comparative test was carried out using specimens prepared in the same manner as that used in Example 10 but with tetrabromosalicylanilide and antimony oxide omitted. The specimens were tested according to the modified version of B.S. 3532 and were found to be flammable. The rate of burning was 0.33 inches per minute.

Example 11

The process of Example 10 was repeated using 10 parts of dibromomonochlorosalicylanilide in place of the 10 parts of tetrabromosalicylanilide. The results obtained are shown in Table 5 below.

TABLE 4

| Example | Percent fire retardant by weight of resin | Percent bromine w./w. of resin | Percent $Sb_2O_3$ by weight of resin | Percent chlorine w./w. of resin | Number of specimens tested | Extent of burning in inches | Rate of burning in inches per minute | Flammability classification |
|---|---|---|---|---|---|---|---|---|
| 4 | 15 | 9.0 | 15 | | 5 | 1.7 | | Self-extinguishing. |
| 5 | 15 | 5.8 | 15 | 1.3 | 5 | 3.5 | | Do. |
| 6 | 15 | 7.8 | 15 | | 5 | 1.5 | | Do. |
| 7 | 10 | 6.0 | 10 | | 3 | | 0.35 | Burning. |
| 8 | 10 | 3.9 | 10 | 0.85 | 3 | | 0.40 | Do. |
| 9 | 10 | 7.2 | 10 | | 5 | 1.1 | | Self-extinguishing. |

TABLE 5

| Example | Percent fire retardant by weight of resin | Percent bromine w./w. of resin | Percent $Sb_2O_3$ w./w. of resin | Percent chlorine w./w. of resin | Number of specimens tested | Extent of burning in inches | Rate of burning in inches per minute | Time for flame to go out in seconds | Flammability classification |
|---|---|---|---|---|---|---|---|---|---|
| 10 | 10 | 6 | 10 | | 4 | 1.0 | | 65 | Low-flammability. |
| 11 | 10 | 3.9 | 10 | 0.85 | 4 | 0.9 | | 49 | Do. |

I claim:
1. An organic polymeric composition comprising, as a fire retardant, a brominated salicylanilide in an amount such as to provide a bromine content of at least 0.5% based on the weight of the polymeric composition.

2. An organic polymeric composition as set forth in claim 1, in which said brominated salicylanilide additionally contains at least one chlorine substituent.

3. An organic polymeric composition as set forth in claim 1, in which said brominated salicylanilide contains from 2 to 6 bromine atoms per molecule.

4. An organic polymeric composition as set forth in claim 1, in which said brominated salicylanilide is selected from the group consisting of tribromosalicylanilides, dibromosalicylanilides, 2',4'-bromo-5-chloro-salicylanilide, 4'-bromo-5-chlorosalicylanilide, pentabromosalicylanilide, hexabromosalicylanilide and heptabromosalicylanilide.

5. An organic polymeric composition as set forth in claim 1, in which the organic polymer is foamed polystyrene and said brominated salicylanilide provides a bromine content of from 0.5 to 1% based on the weight of the composition.

6. An organic polymeric composition as set forth in claim 1, in which the organic polymer is a polyurethane and said brominated salicylanilide provides a bromine content of from 10 to 15% by weight of the polymer.

7. An organic polymeric composition as set forth in claim 1, in which the organic polymer is a polyester and said brominated salicylanilide provides a bromine content of from 0.5 to 10% based on the weight of the composition.

8. An organic polymeric composition as set forth in claim 1, which additionally comprises a second fire retardant selected from the group consisting of oxides and sulphides of antimony, bismuth and arsenic and organic antimonates.

9. An organic polymeric composition as set forth in claim 1, which additionally comprises antimony oxide in a proportion of from 0.5 to 1.5 parts by weight per part by weight of said brominated salicylanilide.

References Cited

UNITED STATES PATENTS

| | | | |
|---|---|---|---|
| 2,990,394 | 6/1961 | Ainsworth | 260—5.9 |
| 3,271,333 | 9/1966 | Eichhorn. | |

GEORGE F. LESMES, *Primary Examiner.*

MORTON FOELAK, *Assistant Examiner.*

U.S. Cl. X.R.

260—45.9, 559, 726